United States Patent [19]

Hammel et al.

[11] 4,244,011
[45] Jan. 6, 1981

[54] RECHARGEABLE FLASHLIGHT

[75] Inventors: Ronald O. Hammel; William J. Barcus, both of Englewood; Irwin C. Cone, Littleton, all of Colo.

[73] Assignee: The Gates Rubber Company, Denver, Colo.

[21] Appl. No.: 69,952

[22] Filed: Aug. 27, 1979

[51] Int. Cl.³ .............................. F21L 9/00; F21L 7/00
[52] U.S. Cl. .................................... 362/183; 362/205; 362/208
[58] Field of Search ......................... 362/183, 205, 208

[56] References Cited

U.S. PATENT DOCUMENTS

| Re. 25,388 | 5/1963 | Moore | 362/183 |
|---|---|---|---|
| 1,506,302 | 8/1924 | Hopkins | 362/183 |
| 2,628,339 | 2/1953 | Worner | 362/183 |
| 2,848,598 | 8/1958 | Amlee | 362/183 |
| 2,963,573 | 12/1960 | Ziegerbein | 362/183 |
| 3,393,312 | 7/1968 | Dahl | 362/183 |
| 3,441,730 | 4/1969 | Doring et al. | 362/183 |
| 3,787,678 | 1/1974 | Rainer | 362/183 |
| 3,885,211 | 5/1975 | Gutai | 362/183 |

OTHER PUBLICATIONS

Sears Tool Catalog (1976–1977) Sears Roebuck Co., p. 39.

*Primary Examiner*—Benjamin R. Padgett
*Assistant Examiner*—Irwin Gluck
*Attorney, Agent, or Firm*—Curtis H. Castleman, Jr.; Raymond Fink; H. W. Oberg, Jr.

[57] ABSTRACT

A rechargeable flashlight is disclosed having the charging unit self-contained in the flashlight housing. A rechargeable cell or cells has its opposite end surfaces making respective abutting contact with adjacent partition members extending transversely and integrally attached to the housing of the flashlight, providing immobilization of the cell(s). A standard two-cell flashlight is retrofitted to house a single rechargeable cell and self-contained tethered charger.

21 Claims, 10 Drawing Figures

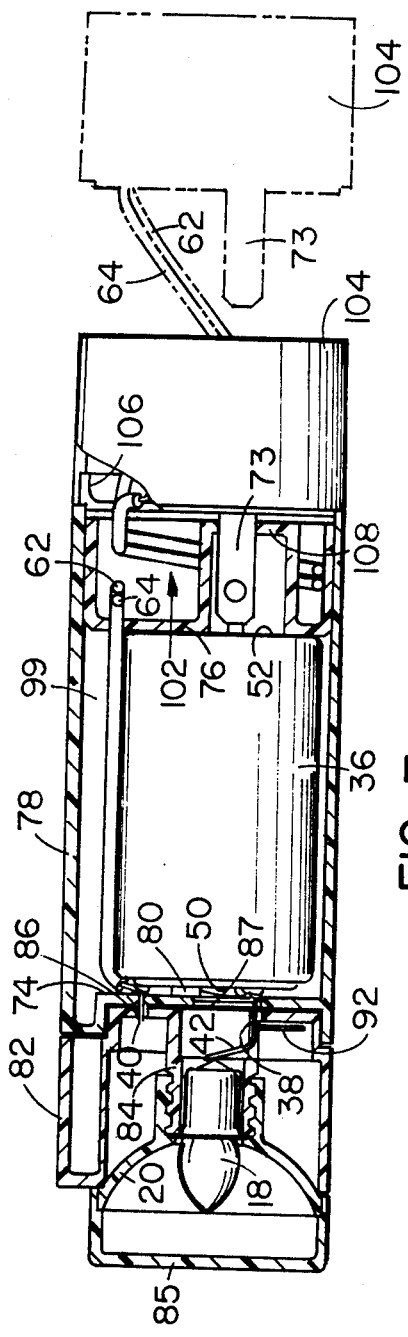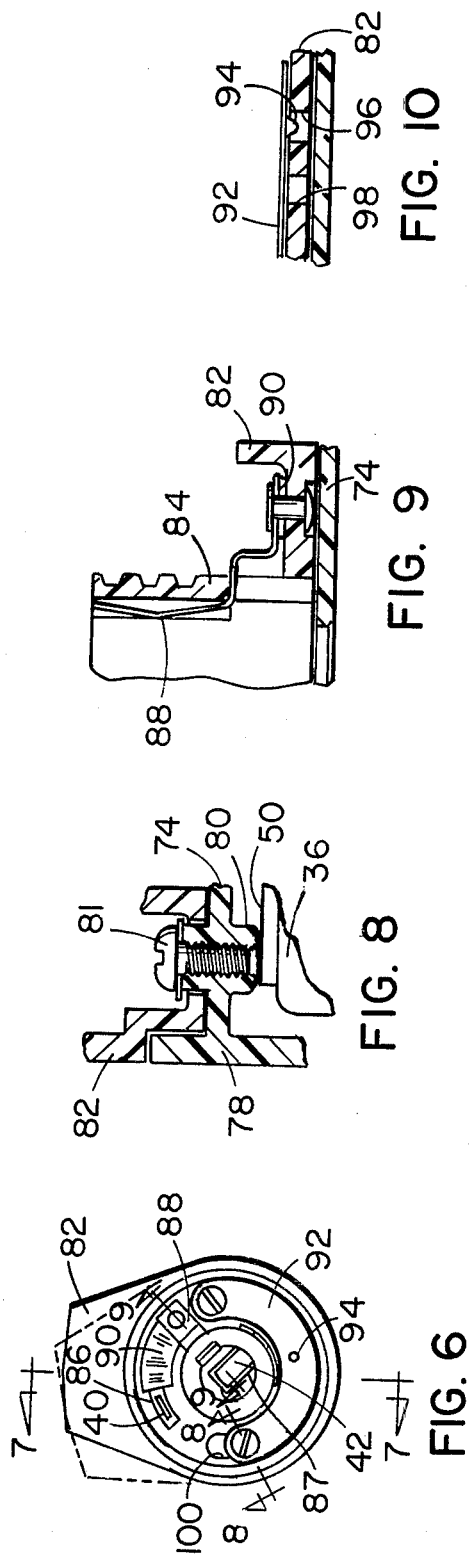

RECHARGEABLE FLASHLIGHT

BACKGROUND OF THE INVENTION

This invention relates to portable illuminating devices, particularly flashlights and the like, which are energized by a rechargeable battery.

The advantages offered by rechargeable batteries for use in portable electric lights such as flashlights are well known. Both the sealed nickel-cadmium and lead-acid batteries are particularly suited for rechargeable lighting devices where long life and a substantially constant voltage discharge is required. In spite of the availability of the rechargeable cells, known rechargeable portable lights have suffered from drawbacks particularly with respect to packaging of the components.

It is an object of this invention to provide a compact assembly in which the charging unit is self-contained within the same housing as the rechargeable cell, and which may be removed from the housing and energized by a power source for recharging, and then reinserted within the housing. It is also an object to provide internal partitioning members within the housing to virtually immobilize the rechargeable cell(s), to prevent particularly axial and rotational movement of the cell within the housing, and to provide shock resistance. It is a further object to utilize a standard two-cell flashlight housing, and to retrofit the same to receive a single rechargeable cell with a tethered charging unit attached to the cell and self-contained within the same flashlight housing adjacent the cell.

Examples of typical rechargeable flashlights of the prior art include those disclosed in U.S. Pat. Nos. 2,876,410 (Fry), 2,995,695 (Reich), and 3,835,309 (Witte et al.).

SUMMARY OF THE INVENTION

Briefly described, the rechargeable portable electric light of the invention includes a housing and a chamber defined therein; first and second partition members extending transversely of the chamber and integrally attached to the housing; at least one rechargeable electrochemical cell disposed between the first and second partition members within the housing, the cell(s) having opposite end surfaces making respective abutting contact with the first and second partition members; a self-contained charger circuit electrically connected to the cell(s) and positioned in the chamber adjacent one of the partition members, including means for coupling the charger circuit to a power source exteriorly of the housing; and means carried by the housing for selectively producing a light beam energized by the cell.

BRIEF DESCRIPTION OF THE DRAWINGS

The invention will be more particularly described with reference to the accompanying drawings, in which like numerals designate like parts, and in which:

FIG. 6 is an end view similar to FIG. 4, of the alternative flashlight embodiment depicted in FIG. 7;

FIG. 7 is an elevational partial sectional view of the alternative flashlight embodiment, viewed along section 7—7 of FIG. 6;

FIG. 8 is a partial sectional view along line 8—8 of FIG. 6;

FIG. 9 is a partial sectional view along line 9—9 of FIG. 6; and

FIG. 10 is a detail partial sectional of the locking mechanism for the switch bezel.

PREFERRED EMBODIMENTS OF THE INVENTION

The invention will first be described with respect to the flashlight illustrated in FIGS. 1-5, and secondly the flashlight illustrated in FIGS. 6-10. However, it is understood that the invention is applicable to other portable electric light structures such as lanterns and the like.

Figure 3:
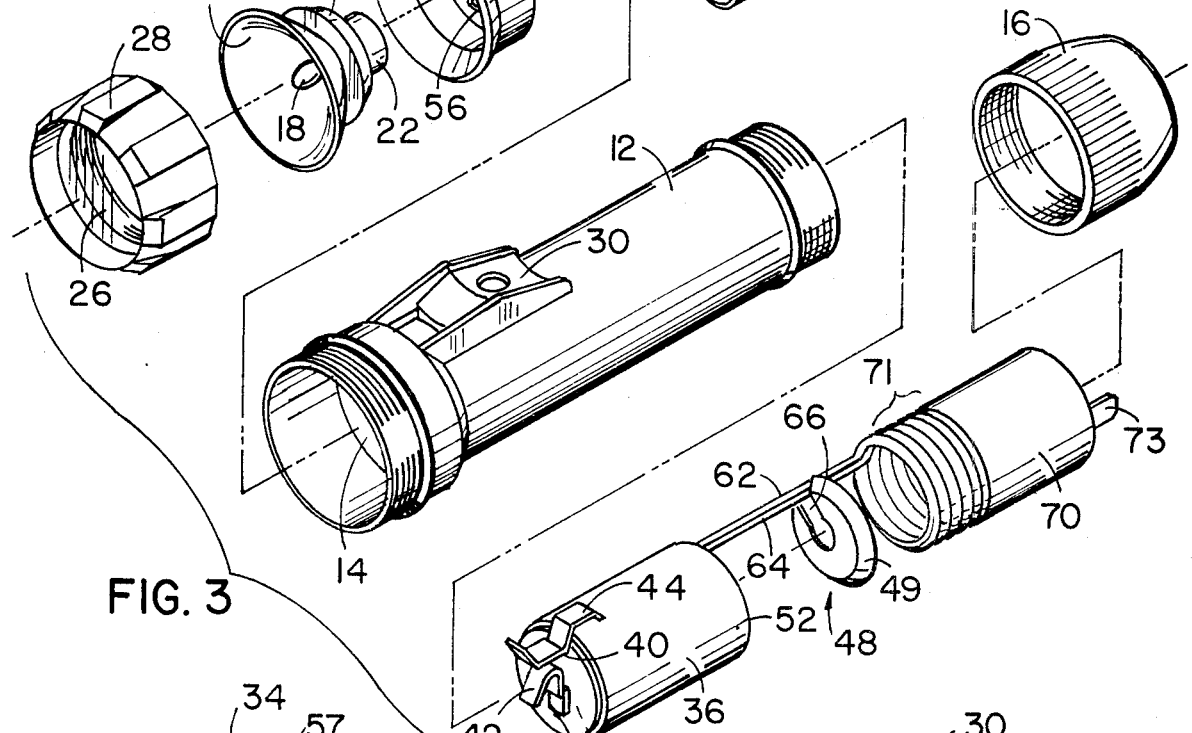
FIG. 3 is a perspective, exploded view of the components of the flashlight of FIG. 1.
Figure 4:
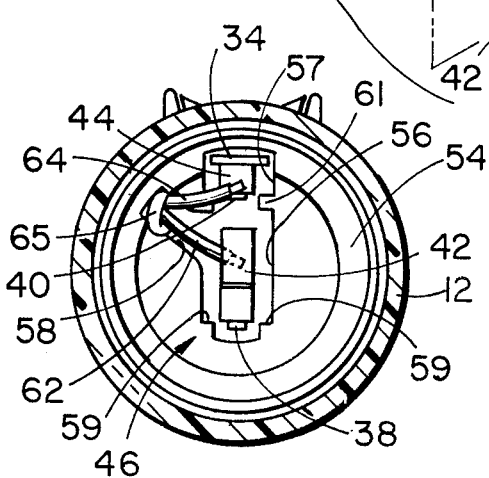
FIG. 4 is an end view along line 4—4 of FIG. 1, excluding the bulb socket and contact ring subassembly.
Figure 5:
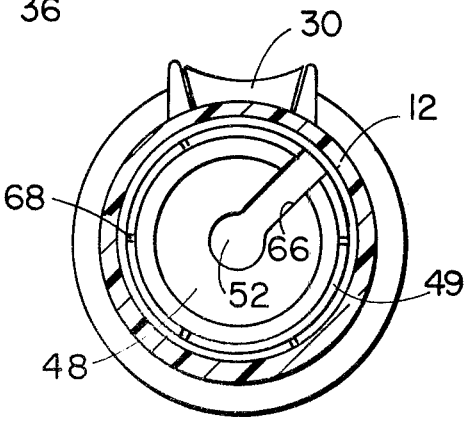
FIG. 5 is an end view along line 5—5 of FIG. 1, excluding the battery lead connections.

In the embodiment of FIGS. 1-5, a standard two cell "D" size flashlight casing is employed, retrofitted for conversion to a rechargeable single cell flashlight generally shown at 10, in accordance with the invention. The standard flashlight components consist of central housing 12 within which is defined an elongate chamber 14, end cap 16 threadedly engaged to the housing, and an illumination subassembly threadedly engaged to the forward end of the housing. The illumination subassembly consists of the standard bulb 18, parabolic reflector 20, insulated bulb socket 22, bulb side contact ring 24, lens 26, and bezel 28 threadedly engaged with the forward end of housing 12. In the usual manner, the bulb 18 is energized by moving thumb switch 30 to the forward position shown in FIG. 1, and selectively deenergized by retraction to the rearward position as shown in FIG. 3. Forward thrusting of the switch 30 cams rivet 32 and attached wiper contact arm 34 to its forward position in contact with bulb side contact ring 24 to complete the circuit. Rearward retraction of thumb switch 30 moves the forward portion of contact wiper 34 out of contact with ring 24, for the off position.

Within the chamber 14 is housed a rechargeable electrochemical cell 36 having a positive spade terminal 38 and negative spade terminal 40. Terminal 38 is bent over and attached (spot welded) to spring terminal 42 making biasing spring contact with the end bulb contact through the conductor portion of bulb socket 22. Negative terminal 40 on the other hand is attached (spot welded) to spring contact 44 which is in spring contact with wiper element 34 both in the on and off positions of switch 30.

Although sealed nickel-cadmium and other rechargeable electrochemical cells may be used, a preferred battery is the spirally wound sealed lead-acid battery of the general type described in McClelland et al. U.S. Pat. No. 3,862,861, particularly because of the long life of the cell, sealed operation, and sufficiently high voltage (2 V.) so that only one cell ("D" size) need be used. Accordingly, the remainder of the chamber 14 is available for the charging components and accessories. Of course, two or more cells or a battery of a desired type may be utilized in accordance with any specific application.

Figure 1:
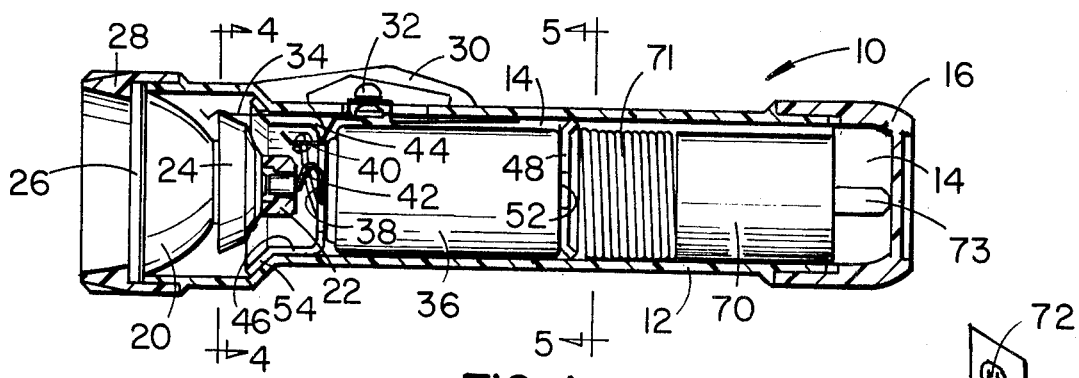
FIG. 1 is an elevational, partial sectional view of a rechargeable flashlight in accordance with the invention.
Figure 2:
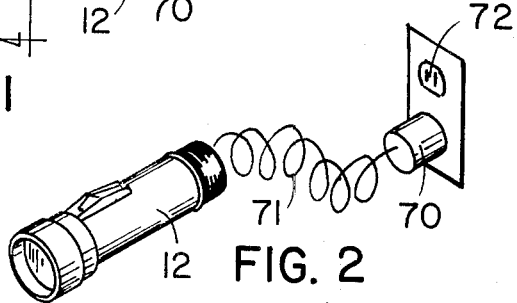
FIG. 2 depicts the manner in which the cell of the flashlight is recharged using a standard wall socket.

Cell 36 is substantially immobilized by sandwiching it between partitions 46 and 48. The respective ends 50, 52 of the cell are in substantial abutment with the partitions and preferably make direct contact as shown in FIG. 1.

Partition member 46 is generally cup-shaped with a flared lip flange 54 which has been ultrasonically welded, solvent welded or otherwise bonded as an integral attachment to the inner surface of housing 14 along the flared flange portion, as shown. Partition 46 is provided with a central window opening 56 which is so configured i.e., with the aid of ear pairs 59 and 61, respectively, to act as abutments for terminals 38 and 40, to restrict rotation of the cell about its central axis. This serves an important function, and thus the cell is substantially immobilized both with respect to axial movement and rotational movement.

Partition 46 is also provided with a slot or window opening 57 within which wiper slide 34 is freely movable back and forth, and side opening window 58 which receives the lead pair 62, 64 which make electrical connections with the respective spring contact tabs 42, 44. It is also preferred to incorporate strain relief in the lead pair as exemplified by knot 65 (shown in FIG. 4 only).

The bottom surface 52 of cell 36 abuts against second partition member 48. Partition 48 is generally disc shaped provided with lip 49 which is also ultrasonically welded or otherwise integrally attached to the housing wall 12. The partition is also provided with slot 66 through which charging lead wires 62, 64 pass alongside the cell 36 eventually terminating in the soldered connections with the cell terminals. Slot 66 together with peripheral notches 68 facilitate insertion of the partition during assembly, and helps ensure achievement of a tight resilient fit within the housing and improves shock resistance to the cell.

The rearward portion of chamber 14 houses a charging device shown generally at 70, which is attached to the terminals of the battery through leads 62 and 64 as aforementioned. Excess coil 71 is provided to allow the charger to be removed from the housing (after unscrewing end cap 16), and then extended and inserted via prongs 73 into an exterior power source such as standard wall socket 72, in tethered fashion. In this manner the charger and leads are always attached to the flashlight unit to prevent misplacement.

The charger circuitry within the charging unit 70 may be of any desired type, of a design compatible with the particular cell being recharged. In general, various types of chargers such as constant current, constant voltage, tapered current or two-step constant current such as taught in Coleman et al. U.S. Pat. No. 3,919,618 are useful.

Turning to the embodiment of FIGS. 6–10, there is shown a flashlight assembly housing a single rechargeable cell 36, which is sandwiched between (in substantial abutment with) partitions 74 and 76. Partition 74 together with housing 78 are unitary, and may be mold-formed of plastic, for instance. Partition 74 includes a pair of threaded bosses 80 which substantially abut against end surface 50 of the cell 36, and which, coupled with partition 76 acting against bottom surface 52 of the cell, limit axial or longitudinal movement of the cell within inner chamber 99 of housing 78.

Interfitting with partition 74 is a rotatably mounted switch bezel 82. The bezel includes a socket 84 which receives bulb 18 and reflector assembly 20 threaded thereon. Lens 85 is attached to the reflector by cementing or spin-welding, for instance.

Bezel 82 is also provided with apertures or window openings 86, 87 respectively, which limit the rotative movement of cell 36, with the window openings acting as rotational stops for the respective spade terminals 38, 40.

The positive electrode terminal of the cell is connected to the end bulb contact through spring contact 42. Contact to the side of the bulb from the negative is facilitated by spring contact 88, shown in FIGS. 6 and 9. The switching function is achieved by rotation of bezel 82 as shown in phantom in FIG. 6. This causes switch blade 90 to rotate counter clockwise relative to the cell to make spring contact over the top of spade terminal 40. The bezel rotates until the switch blade 90 contacts terminal 40 and simultaneously detent ring 92 with detent 94 engages corresponding aperture 96 of bezel 82 (see FIG. 10 especially). To switch the battery (flashlight) off, the bezel is simply moved back to its upright position with detent 94 being received in aperture 98. Machine screws 81 fasten ring 92 in place within the threaded bosses 80, and the bezel assembly slides in slots 100.

As aforementioned, the cell 36 is substantially immobilized between abutting partitions 74 and 76. Partition 76 is formed of a molded plastic housing which fits snugly within housing 78, and may be cemented or ultrasonically welded thereto, for instance. Leads 62 and 64 penetrate an opening in partition 76 and are coiled therein as designated by numeral 102. In this embodiment, end cap 104 also serves to house the charging circuitry (not shown) together with inner charging cap 106. The end cap/charger subassembly may be removed in a tethered fashion from the housing as shown in phantom. Prongs 73, which normally are engaged in a molded end receptacle 108 of partition member 76, may then be inserted in the normal 110 V or 220 V socket for recharging the cell. The embodiment of FIG. 7 is compact and is fully self-contained, while providing the advantage of a tethered attachment between the flashlight housing and charger subassembly.

While certain representative embodiments and details have been shown for the purpose of illustrating the invention, it will be apparent to those skilled in this art that various changes and modifications may be made therein without departing from the spirit or scope of the invention. For instance, the charger units 70, 104 may be adapted to be replaceable with a D.C. charger unit for plugging into the cigarette lighter of an automobile.

We claim:

1. A rechargeable portable electric light such as a flashlight comprising:
   a housing and a chamber defined therein;
   first and second partition members extending transversely of the chamber at least one of which is integrally attached to the housing;
   at least one rechargeable electrochemical cell disposed between the first and second partition members within the housing, the cell(s) having opposite generally planar end surfaces making respective substantial abutting contact with the first and second partition members;
   a self-contained charger circuit electrically connected to the cell(s) and positioned in the chamber adjacent one of the partition members, and means for coupling the charger circuit to a power source exteriorly of the housing; and
   means carried by the housing for selectively producing a light beam energizeable by the cell.

2. The rechargeable light of claim 1 wherein one of the partition members is unitary with the housing.

3. The rechargeable light of claim 1 wherein the cell has at least one terminal protruding from one of said end surfaces, and such terminal penetrates a window opening formed in the partition member adjacent the end surface having the protruding terminal, adapted and arranged so that rotational movement of the cell about an axis thereof is restricted.

4. The rechargeable light of claim 1 wherein the self-contained charger circuit is tethered and movable with respect to the housing for removed coupling with the power source exteriorly of the housing.

5. The rechargeable light of claim 4 wherein the self-contained charger is integral with an end cap of the light.

6. A rechargeable flashlight comprising:
a housing and a chamber defined therein;
first and second partition members bridging the housing and sandwiching at least one rechargeable electrochemical cell therebetween and provided with output terminals;
a rotatable bezel switch housing including contact means adapted to establish a circuit through contact of an output terminal of the cell upon rotation of the bezel and contact means relative to the cell;
lamp means forming part of the circuit for producing a light beam; and
self-contained charger means attached to the housing and movable to a tethered position for energization.

7. The flashlight of claim 6 wherein the contact means includes a switch blade spring movable upon rotation of the bezel to make direct electrical contact with a protruding output terminal of the cell.

8. The flashlight of claim 6 wherein one of the partitions and the housing are formed of a unitary plastic molding.

9. The flashlight of claim 8 wherein the partition unitary with the housing includes a plurality of bosses which make abutting contact with the cell.

10. In a standard flashlight having a housing adapted to receive a pair of "D" size cells, an end cap, and an illumination subassembly mounted to the forward end of the flashlight housing, the improvement comprising:
first and second partition members extending transversely and at least one of which is integrally attached to the housing;
at least one rechargeable electrochemical cell disposed between the first and second partition members within the housing, the cell being substantially immobilized between the first and second partition members, both with respect to axial and rotational movement of the cell(s); and
a self-contained charger circuit electrically connected to the cell(s) and positioned within the housing between one of the partition members and the end cap, and means for coupling the charger circuit in a tethered fashion to a power source exteriorly of the housing whereby the charger circuit is maintained at a remote distance from the cell(s) during charging.

11. The rechargeable flashlight of claim 10 wherein the charger circuitry is formed as a unitary element with prongs emanating therefrom for coupling with the power source, and a coil of wire interconnecting the opposite polarity terminals of the rechargeable cell with the charger permitting the charger to be tethered with respect to the housing.

12. The rechargeable flashlight of claim 11 wherein said wire penetrates openings in the partition members.

13. The rechargeable flashlight of claim 10 wherein a single "D" size cell is disposed within the housing.

14. A shock resistant rechargeable flashlight comprising:
an elongated housing with a generally cylindrical chamber defined therein;
a battery consisting of at least one sealed self-contained electrochemical cell disposed within the chamber;
means adjacent end surfaces of the battery substantially immobilizing the battery to preclude longitudinal movememt within the chamber; and
self-contained charger means positioned within the chamber and permanently connected to the battery through leads, and movable to a tethered position exteriorly of the housing.

15. The flashlight of claim 14 wherein the immobilizing means comprises partitioning members extending transversely of the chamber, at least one of which is fixedly attached to the housing.

16. The flashlight of claim 15 including means restricting rotational movement of the battery within the chamber.

17. The flashlight of claim 16 wherein the means for restricting rotational movement comprises abutments formed by opening(s) in one of said partitioning members adapted to react against terminal member(s) of a cell protruding through the opening(s).

18. The flashlight of claim 14 wherein the charger means is adapted to be energized from an A.C. source.

19. The rechargeable light of claim 1 wherein both of the first and second partition means are integrally attached to the housing.

20. The rechargeable flashlight of claim 10 wherein both of the first and second partition members are integrally attached to the housing.

21. The rechargeable flashlight of claim 14 wherein both of the first and second partition members are integrally attached to the housing.

* * * * *